United States Patent
Park et al.

(10) Patent No.: US 9,278,488 B2
(45) Date of Patent: Mar. 8, 2016

(54) POLYAMIC ACID POLYMER COMPOSITE AND PREPARATION METHOD THEREOF

(71) Applicant: LG CHEM, LTD., Seoul (KR)

(72) Inventors: HangAh Park, Daejeon (KR); BoRa Shin, Daejeon (KR); Cheolmin Yun, Daejeon (KR); Kyungjun Kim, Daejeon (KR); JinHo Lee, Daejeon (KR); Jung Ho Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/354,849

(22) PCT Filed: Jul. 3, 2013

(86) PCT No.: PCT/KR2013/005907
§ 371 (c)(1),
(2) Date: Apr. 28, 2014

(87) PCT Pub. No.: WO2014/007544
PCT Pub. Date: Jan. 9, 2014

(65) Prior Publication Data
US 2014/0316074 A1 Oct. 23, 2014

(30) Foreign Application Priority Data

Jul. 3, 2012 (KR) .................. 10-2012-0072298
Jul. 2, 2013 (KR) .................. 10-2013-0077439

(51) Int. Cl.
| | |
|---|---|
| C08L 79/08 | (2006.01) |
| C08K 3/34 | (2006.01) |
| C08J 9/00 | (2006.01) |
| B29D 7/01 | (2006.01) |
| C08G 73/10 | (2006.01) |
| C09D 179/08 | (2006.01) |
| C08K 9/06 | (2006.01) |

(52) U.S. Cl.
CPC .............. *B29D 7/01* (2013.01); *C08G 73/1039* (2013.01); *C08G 73/1042* (2013.01); *C08G 73/1053* (2013.01); *C08G 73/1067* (2013.01); *C08G 73/1071* (2013.01); *C08K 9/06* (2013.01); *C09D 179/08* (2013.01)

(58) Field of Classification Search
None
See application file for complete search history.

(56) References Cited

U.S. PATENT DOCUMENTS

| | | |
|---|---|---|
| 5,585,217 A | 12/1996 | Oba |
| 2004/0013953 A1 | 1/2004 | Mune et al. |
| 2004/0048188 A1 | 3/2004 | Hatanaka et al. |
| 2006/0122350 A1* | 6/2006 | Wei et al. .................. 528/25 |
| 2007/0009751 A1 | 1/2007 | Hwang et al. |
| 2009/0111948 A1 | 4/2009 | Dueber et al. |
| 2009/0123698 A1 | 5/2009 | Nishino et al. |
| 2011/0269857 A1 | 11/2011 | Lee et al. |
| 2011/0306687 A1 | 12/2011 | Lee et al. |

FOREIGN PATENT DOCUMENTS

| | | |
|---|---|---|
| CN | 1436815 A | 8/2003 |
| CN | 102203168 A | 9/2011 |
| JP | 2007-254499 A | 10/2007 |
| JP | 2012-505287 A | 3/2012 |
| KR | 10-2009-0064288 A | 6/2009 |
| KR | 10-2010-0040269 A | 4/2010 |

OTHER PUBLICATIONS

Ishii J. et al., "Organo-soluble Polyimides and Their Applications to Photosensitive Cover Layer Materials in Flexible Printed Circuit Boards", Journal of Photopolymer Science and Technology, 2008, vol. 21, No. 1, pp. 107-112.
International Search Report cited in PCT/KR2013/005907, dated Oct. 7, 2013, 3 pages.

* cited by examiner

*Primary Examiner* — Ana Woodward
(74) *Attorney, Agent, or Firm* — Rothwell, Figg, Ernst & Manbeck, P.C.

(57) ABSTRACT

The present invention relates to a polyamic acid polymer composite and a method for producing the same, and more specifically, a polyamic acid polymer composite, which can be applied to display substrate production due to its high transparency and low thermal expansion of glass-level, and a method for producing same. The polyamic acid polymer composite comprises 50 to 99 wt % of a polyamic acid polymer having a repeating unit of Chemical Formula 1; and 1 to 50 wt % of a silica-based particle:

[Chemical Formula 1]

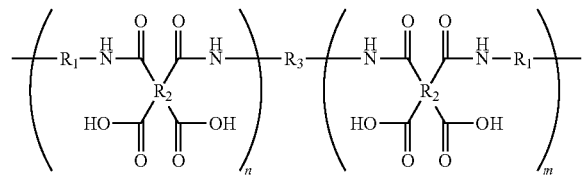

wherein, $R_1$ to $R_3$, m and n have the same meanings as defined in the specification.

7 Claims, No Drawings

POLYAMIC ACID POLYMER COMPOSITE AND PREPARATION METHOD THEREOF

This application is a 35 U.S.C. 371 National Phase Entry Application from PCT/KR2013/005907, filed Jul. 3, 2013, which claims the benefit of Korean Application 10-2012-0072298 filed Jul. 3, 2012 and Korean Application No. 10-2013-0077439 filed Jul. 2, 2013, the disclosures of which are incorporated herein in their entirety by reference.

FIELD OF THE INVENTION

The present invention relates to a polyamic acid polymer composite and a method for producing same, and more specifically, a polyamic acid polymer composite, which can be used for producing display substrates due to its high transparency and low thermal expansion, and a method for producing same.

BACKGROUND OF THE INVENTION

Polyimide films have good mechanical properties and other good characteristics such as heat resistance, chemical resistance, and electrical insulation properties and are therefore widely used as various films for optical waveguides and electronic devices such as interlayer dielectric films for semiconductors, buffer coatings, substrates for flexible printed circuit, and alignment films for liquid-crystal displays.

Glass is widely used as substrates for liquid crystal displays, organic electro luminescence displays, organic thin-film transistors, etc. until now. However, with the trend toward lightweight, flexible display, flexible substrates made of plastics such as PEN (polyethylene naphthalate) and PES (polyethersulfone) are being developed. The flexible substrate should have high transparency, low thermal expansion, and high glass transition temperature. In particular, the light transmittance of a film of 10 to 30 μm in thickness must be 80% or more; in order to prevent improper arrangement of display pixels and wiring deviation on a substrate due to expansion or contraction of the substrate, the thermal expansion coefficient must be 20 ppm/° C. or less in the range of 100 to 300° C.; and glass transition temperature must be 350° C. or higher.

It is known that the introduction of a highly flexible monomer or a fluoro group into the polyimide skeleton is effective to obtain a highly transparent polyimide film. For example, a totally fluorinated polyimide obtained from 2,2-bis(3,4-carboxyphenyl)hexafluoropropanoic dianhydride (a fluorinated acid dianhydride) and 2,2'-bis(trifluoromethyl)benzidine (a fluorinated diamine) is known. A film having the thickness of 20 μm obtained from the aforementioned totally fluorinated polyimide exhibits a light transmittance as high as 85% at wavelength of 400 nm. However, the coefficient of thermal expansion of the film is as high as 48 ppm/° C.

REFERENCES OF THE RELATED ART

Patent Document (Patent Document 1) Korean Patent Registration No. 117581 (Registered on Aug. 14, 2012)
(Patent Document 2) Korean Patent Registration No. 1167483 (Registered on Jul. 13, 2012)

SUMMARY OF THE INVENTION

In is one object of the present invention to provide a polyamic acid polymer composite, which can be used for manufacturing display substrates due to its high transparency and thermal expansion as low as glass-level, and a method for producing the polyamic acid polymer composite.

Further the present invention provides a polyimide polymer composite produced by using the polyamic acid polymer composite, and a display substrate using same.

In order to accomplish one object of the present invention, the polyamic acid polymer composite according to one aspect of the present invention comprises: 50 to 99 wt % of a polyamic acid polymer having a repeating unit represented by Chemical Formula 1; and 1 to 50 wt % of a silica-based particle:

[Chemical Formula 1]

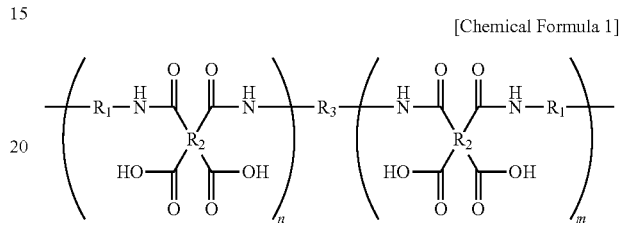

Wherein,
$R_1$ is selected from the group consisting of aromatic, cycloaliphatic and divalent aliphatic organic groups;
$R_2$ is selected from the group consisting of aromatic, cycloaliphatic and tetravalent aliphatic organic groups;
$R_3$ is selected from the group consisting of divalent or higher valent organic groups, which are derived from aromatic, cycloaliphatic or aliphatic groups optionally having a hydroxyl group; and
n and m are each independently an integer of 1 or more.

Preferably, $R_3$ may be selected from the group consisting of divalent or higher valent organic groups, which are derived from an aromatic, cycloaliphatic or aliphatic group having a hydroxyl group.

One or more hydrogen atoms in the organic group of $R_1$, or one or more hydrogen atoms in the organic group of $R_3$ of Chemical Formula 1 may be substituted with a fluoroalkyl group.

According to one embodiment of the present invention, a silicon atom on the surface of the silica-based particle may be chemically bonded to $R_3$.

The silica-based particle may be chemically bonded to $R_3$ of the repeating unit via a bond selected from the group consisting of an ether bond, an amide bond and an ester bond.

The silica-based particle may comprise —Si—O— bonds forming a network structure.

$R_1$ of Chemical Formula 1 may be a divalent organic group, which is selected from the group consisting of aromatic divalent organic groups of Chemical Formulas 2a to 2d; divalent cycloaliphatic organic groups of Chemical Formula 2e; divalent cycloaliphatic organic groups comprising a cycloalkandiyl group with carbon number 4 to 18; and divalent aliphatic organic groups comprising an alkandiyl group with carbon number 1 to 8:

[Chemical Formula 2a]

[Chemical Formula 2b]

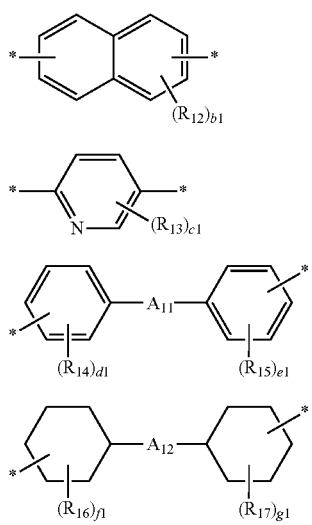

[Chemical Formula 2c]

[Chemical Formula 2d]

[Chemical Formula 2e]

wherein, $R_{11}$ to $R_{17}$ are each independently selected from the group consisting of an alkyl group with carbon number 1 to 10, a fluoroalkyl group with carbon number 1 to 10, an aryl group with carbon number 6 to 12, a sulfonyl group and a carboxyl group;

a1, d1 and e1 are each independently an integer of 0 to 4;

b1 is an integer of 0 to 6;

c1 is an integer of 0 to 3;

f1 and g1 are each independently an integer of 0 to 10; and $A_{11}$ and $A_{12}$ are each independently selected from a single bond, —O—, —$CR_{18}R_{19}$—, —C(=O)—, —C(=O)NH—, —S—, —$SO_2$—, phenylene group and a combination thereof, wherein $R_{18}$ and $R_{19}$ are each independently selected from the group consisting of a hydrogen atom, an alkyl group with carbon number 1 to 10 and a fluoroalkyl group with carbon number 1 to 10.

Further, $R_1$ of Chemical Formula 1 may be selected from the group consisting of divalent organic groups of Chemical Formulas 3a to 3u.

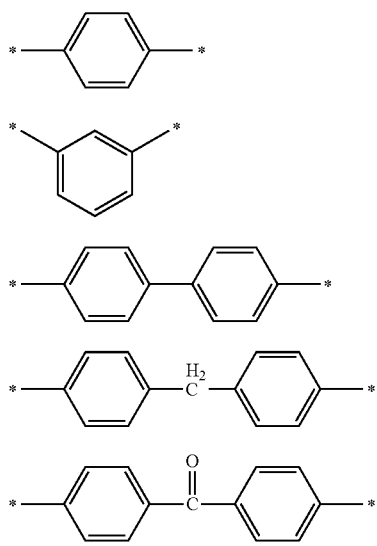

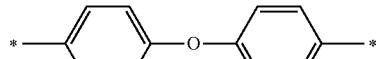
(3f)

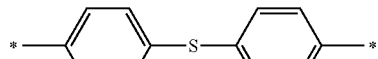
(3g)

(3h)

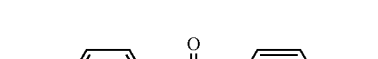
(3i)

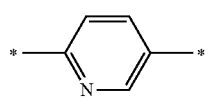
(3j)

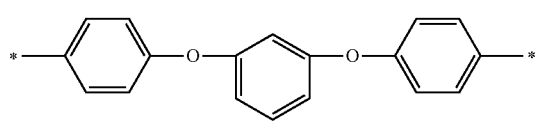
(3k)

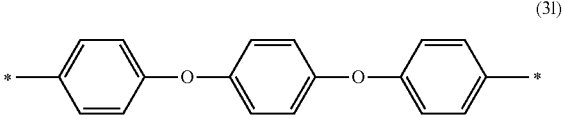
(3l)

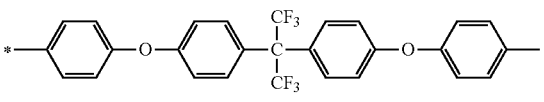
(3m)

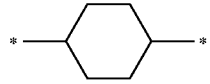
(3n)

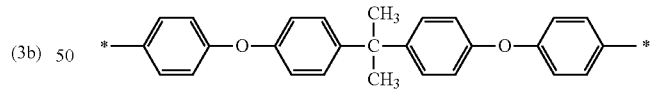
(3o)

(3p)

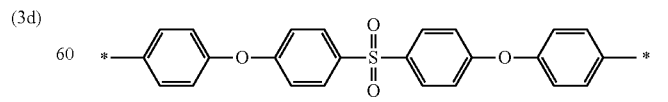
(3q)

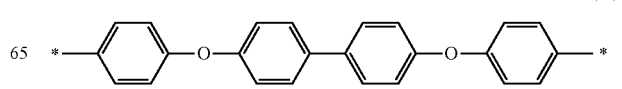
(3r)

-continued (3s)
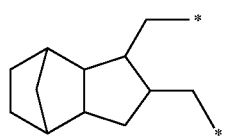

(3t)
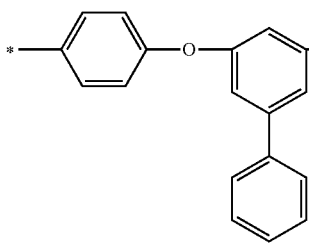

(3u)
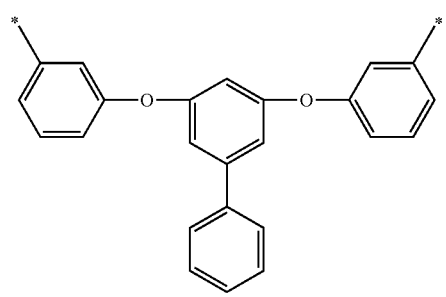

$R_2$ of Chemical Formula 1 may be selected from the group consisting of tetravalent aromatic groups of Chemical Formulas 4a to 4d; tetravalent cycloaliphatic groups comprising a cycloalkane structure with carbon number 3 to 12; tetravalent cycloaliphatic groups of Chemical Formula 4e; and tetravalent aliphatic groups comprising a branched alkane structure with carbon number 1 to 10:

[Chemical Formula 4a]

[Chemical Formula 4b]

[Chemical Formula 4c]

[Chemical Formula 4d]

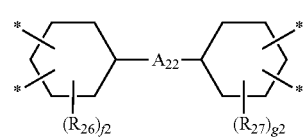

[Chemical Formula 4e]

$R_{21}$ to $R_{27}$ are each independently an alkyl group with carbon number 1 to 10 or a fluoroalkyl group with carbon number 1 to 10;

a2 is an integer of 0 or 2;
b2 is an integer of 0 to 4;
c2 is an integer of 0 to 8;
d2 and e2 are each independently an integer of 0 to 3;
f2 and g2 are each independently an integer of 0 to 9; and
$A_{21}$ and $A_{22}$ are each independently selected from the group consisting of a single bond, —O—, —$CR_{28}R_{29}$—, —C(=O)—, —C(=O)NH—, —S—, —$SO_2$—, phenylene group and a combination thereof, wherein $R_{28}$ and $R_{29}$ are each independently selected from the group consisting of a hydrogen atom, an alkyl group with carbon number 1 to 10 and a fluoroalkyl group with carbon number 1 to 10.

Further, $R_2$ of Chemical Formula 1 may be a tetravalent organic group selected from the group consisting of tetravalent organic groups of Chemical Formula 5a to 5t:

(5a)
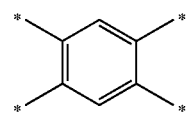

(5b)
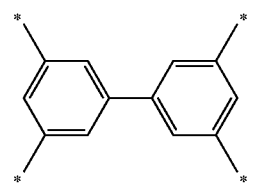

(5c)
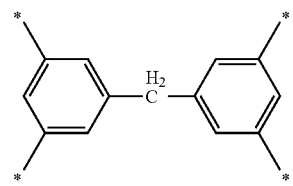

(5d)
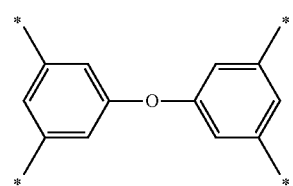

(5e)
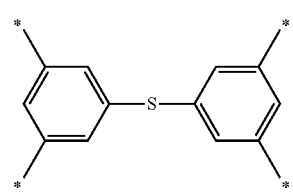

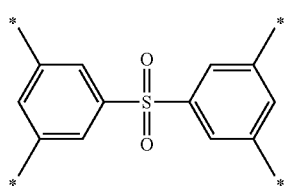
(5f)

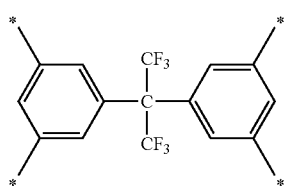
(5g)

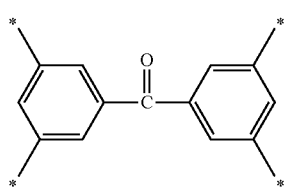
(5h)

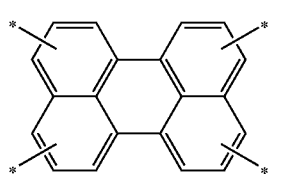
(5i)

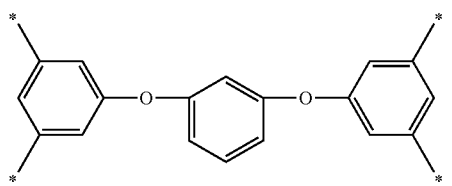
(5j)

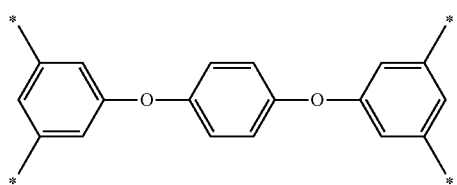
(5k)

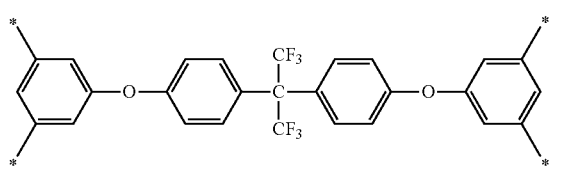
(5l)

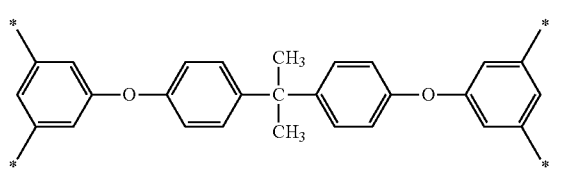
(5m)

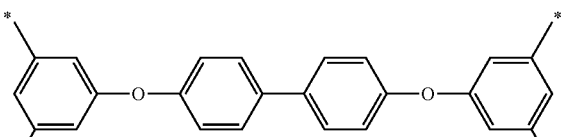
(5n)

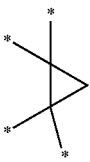
(5o)

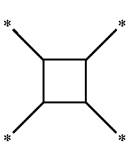
(5p)

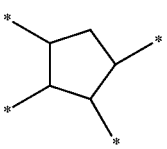
(5q)

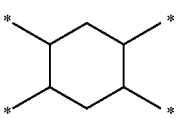
(5r)

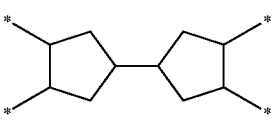
(5s)

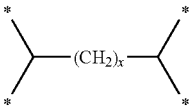
(5t)

wherein, x is an integer of 1 to 3.

$R_3$ of Chemical Formula 1 may be an organic group derived from diamine, which comprises a divalent or higher valent organic group selected from the group consisting of aromatic, cycloaliphatic and aliphatic organic groups, and at least one hydrogen atom contained in the organic group is substituted with a hydroxyl group.

Further, $R_3$ of Chemical Formula 1 may be a divalent or higher valent organic group derived from a compound selected from the group consisting of 2,2-bis(3-amino-4-hydroxyphenyl)-hexafluoropropane, 3,3'-dihydroxy-4,4'-diaminobiphenyl, and 2,2-bis(3-amino-4-hydroxyphenyl) sulfone.

Another aspect of the present invention provides a polyimide polymer composite, which may be obtained by curing the polyamic acid composite, and comprises a polyimide polymer having a repeating unit represented by Chemical Formula 6, and a silica-based particle:

[Chemical Formula 6]

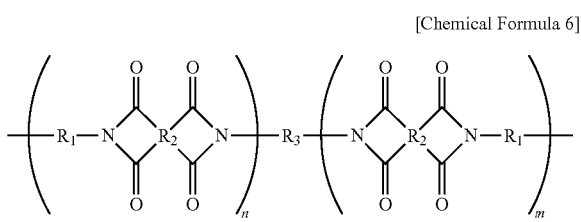

wherein, $R_1$ is selected from the group consisting of aromatic, cycloaliphatic and divalent aliphatic organic groups;

$R_2$ is selected from the group consisting of aromatic, cycloaliphatic and tetravalent aliphatic organic groups;

$R_3$ is selected from the group consisting of divalent or higher valent organic groups, which are derived from aromatic, cycloaliphatic or aliphatic groups optionally having a hydroxyl group; and n and m are each independently an integer of 1 or more.

The silica-based particle may comprise —Si—O— bonds forming a network structure.

A silicon atom on the surface of the silica-based particle may be chemically bonded to $R_3$.

The polyimide polymer composite may be processed to make film, which can be used for display substrates.

The display substrate having a thickness range of 10 to 30 μm may have a light transmittance of 80% or more at a wavelength of 550 nm; a coefficient of thermal expansion of 20 ppm/K or less in a temperature range of 100 to 300° C.; and a glass transition temperature (Tg) of 350° C. or higher.

The method for producing a polyamic acid polymer composite comprising the repeating unit represented by Chemical Formula 1 according to another aspect of the present invention may comprise the steps of:

producing a polyamic acid having a repeating unit of Chemical Formula 7 by reacting a diamine, a tetracarboxylic acid dianhydride, and optionally a diamine having a hydroxyl group; and mixing and reacting the produced polyamic acid with a silica-based particle to produce a composite comprising a polyamic acid polymer having a repeating unit of Chemical Formula 1 and a silica-based particle; or reacting the produced polyamic acid with a silane compound of Chemical Formula 8 to produce a polyamic acid polymer and then reacting with alkoxysilane to produce a polyamic acid polymer composite comprising the repeating unit of Chemical Formula 1 and a silica-based particle chemically bonded to $R_3$ of the repeating unit via a bond selected from the group consisting of an ether bond, an amide bond and an ester bond:

[Chemical Formula 7]

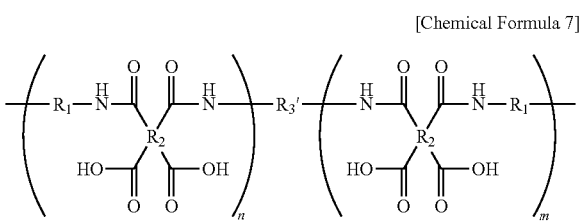

X—Si—(OR)$_3$       [Chemical Formula 8]

wherein, $R_1$ is selected from the group consisting of aromatic, cycloaliphatic and divalent aliphatic organic groups;

$R_2$ is selected from the group consisting of aromatic, cycloaliphatic and tetravalent aliphatic organic groups;

$R_3'$ is selected from the group consisting of aromatic, cycloaliphatic and divalent aliphatic organic groups optionally having a hydroxyl group;

R is an alkyl group with carbon number 1 to 5;

X is a monovalent aliphatic or aromatic organic group comprising an electrophile; and n and m are each independently an integer of 1 or higher.

The diamine may be a compound comprising a divalent organic group selected from the group consisting of divalent aromatic, cycloaliphatic and aliphatic organic groups, and two amino groups bonded to the divalent organic group.

Herein, the diamine having a hydroxyl group may be a compound comprising a divalent organic group selected from the group consisting of divalent aromatic, cycloaliphatic and aliphatic organic groups, and two amino groups bonded to the divalent organic group, wherein one or more hydrogen atoms in the divalent organic group are substituted with a hydroxyl group.

Further, the diamine or the diamine having a hydroxyl group may be a compound, wherein one or more hydrogen atoms in the molecule are substituted with a fluoroalkyl group with carbon number 1 to 10.

Further, the diamine having a hydroxyl group may be selected from the group consisting of 2,2-bis(3-amino-4-hydroxyphenyl)-hexafluoropropane, 3,3'-dihydroxy-4,4'-diaminobiphenyl, 2,2-bis(3-amino-4-hydroxyphenyl)sulfone and a mixture thereof.

The molar ratio between the diamine and the diamine having a hydroxyl group may be in the range of 99:1 to 60:40.

The electrophilic group of Chemical Formula 8 may be selected from the group consisting of an isocyanate group, an ester group, an epoxy group and a combination thereof.

Further, the compound of Chemical Formula 8 may be isocyanato propyltriethoxysilane or 3-glycidyloxypropyl triethoxysilane.

The alkoxysilane may be selected from the group consisting of monoalkoxysilane, dialkoxysilane, trialkoxysilane, tetraalkoxysilane and a mixture thereof.

The method for producing a display substrate according to further another aspect of the present invention may comprise the steps of:

forming a polyimide polymer composite film by coating a composition comprising the polyamic acid polymer composite on a support followed by curing thereof; and separating the polyimide polymer composite film from the support.

Hereinafter, further embodiments will be described in detail.

ADVANTAGEOUS EFFECTS OF THE INVENTION

The display substrate produced by using the polyamic acid polymer composite according to the present invention can be applied to a flexible display due to its high transparency and low thermal expansion.

DETAILED DESCRIPTION OF THE INVENTION

As the present invention allows for various changes and numerous embodiments, particular embodiments will be illustrated in the drawings and described in detail. However, this is not intended to limit the present invention to particular modes of practice, and it is to be appreciated that all changes, equivalents, and substitutes that do not depart from the spirit and technical scope of the present invention are encompassed in the present invention. When it is determined that a detailed description is related to relevant known technologies which may make the purpose of the present invention unnecessarily ambiguous in the description of the present invention, such detailed description will be omitted.

Unless otherwise stated herein, all compounds or functional groups may be substituted or unsubstituted. Herein, the term 'substituted' refers that at least one hydrogen contained in a compound or a functional group is substituted with a substituent selected from the group consisting of a halogen atom, an alkyl group or halogenated alkyl group with carbon number 1 to 10, a cycloalkyl group with carbon number 3 to 30, an aryl group with carbon number 6 to 30, a hydroxyl group, an alkoxy group with carbon number 1 to 10, a carboxyl group, an aldehyde group, an epoxy group, a cyano group, a nitro group, an amino group, a sulfonic acid group and derivatives thereof.

Further, unless otherwise stated herein, the term 'combination thereof' refers that two or more functional groups are bonded to each other by a linker such as a single bond, a double bond, a triple bond, an alkylene group with carbon number 1 to 10 (for example, methylene (—$CH_2$—), ethylene (—$CH_2CH_2$—) and the like), a fluoroalkylene group with carbon number 1 to 10 (for example, fluoromethylene (—$CF_2$—), perfluoroethylene (—$CF_2CF_2$—) and the like), a hetero atom such as N, O, P, S or Si, or a functional group containing thereof (specifically, a heteroalkylene group containing an intramolecular carbonyl group (—C=O—), ether group (—O—), ester group (—COO—), —S—, —NH—, —N=N— and the like), or two or more functional groups are condensed and linked to each other.

The present invention provides a polyamic acid polymer composite comprising a polyamic acid polymer, which has a repeating unit of Chemical Formula 1, and a silica-based particle:

[Chemical Formula 1]

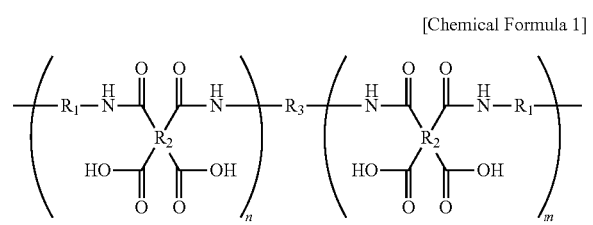

wherein, $R_1$ is selected from the group consisting of divalent aromatic, cycloaliphatic and aliphatic organic groups;

$R_2$ is selected from the group consisting of tetravalent aromatic, cycloaliphatic and aliphatic organic groups;

$R_3$ is selected from the group consisting of divalent or higher valent organic groups, which are derived from aromatic, cycloaliphatic or aliphatic groups optionally having a hydroxyl group; and n and m are each independently an integer of 1 or more.

The present invention further provides a polyimide polymer composite comprising a polyimide having a repeating unit of Chemical Formula 6, and a silica-based particle physically or chemically bonded to $R_3$ of the repeating unit via a bond selected from the group consisting of an ether bond, an amide bond and an ester bond; and a display substrate comprising a film of the composite:

[Chemical Formula 6]

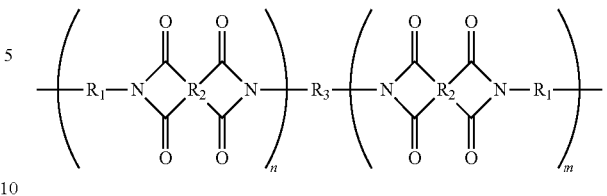

wherein, $R_1$ to $R_3$, n and m have the same meanings as defined previously.

Further, the present invention provides a method for producing a polyamic acid polymer composite of Chemical Formula 1 comprising the steps of:

reacting diamine, tetracarboxylic acid dianhydride, and, optionally, diamine having a hydroxyl group to produce a polyamic acid having a repeating unit of Chemical Formula 7; and mixing and reacting the produced polyamic acid with a silica-based particle to produce a composite comprising a polyamic acid polymer having a repeating unit of Chemical Formula 1 and a silica-based particle; or reacting the produced polyamic acid and a silane compound of Chemical Formula 8 to produce a polyamic acid polymer followed by reacting alkoxysilane to produce a polyamic acid polymer composite comprising the repeating unit of Chemical Formula 1 and a silica-based particle chemically bonded to $R_3$ of the repeating unit via a bond selected from the group consisting of an ether bond, an amide bond and an ester bond:

[Chemical Formula 7]

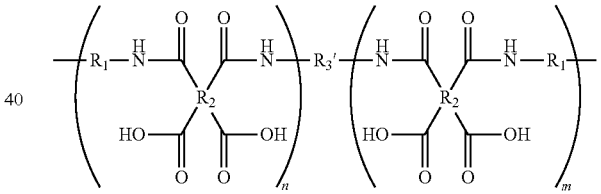

X—Si—(OR)$_3$    [Chemical Formula 8]

wherein, $R_1$ to $R_3$, n and m have the same meanings as defined previously;

$R_3'$ is selected from the group consisting of divalent aromatic, cycloaliphatic and aliphatic organic groups optionally having a hydroxyl group;

R is an alkyl group with carbon number 1 to 5; and

X is a monovalent aliphatic or aromatic organic group comprising an electrophile.

Further, the present invention provides a method for producing a display substrate comprising the steps of:

forming a polyimide polymer composite film by coating a composition comprising the polyamic acid polymer composite on a support followed by curing thereof; and separating the polyimide polymer composite film from the support.

Hereinafter, the polyamic acid polymer composite and the method for producing same, and the display substrate using same and a method for producing same according to embodiments of the present invention will be described in detail.

According to one embodiment of the present invention, the polyamic acid polymer composite comprises a polyamic acid polymer having a repeating unit of Chemical Formula 1; and a silica-based particle physically or chemically bonded to $R_3$ of the repeating unit via a bond selected from the group consisting of an ether bond, an amide bond and an ester bond:

[Chemical Formula 1]

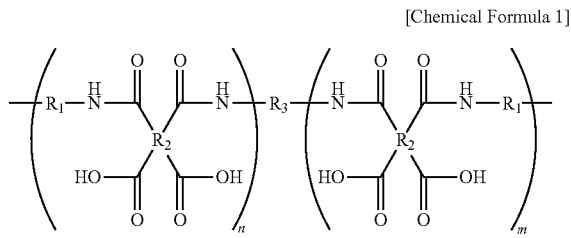

wherein, $R_1$ is selected from the group consisting of divalent aromatic, cycloaliphatic and aliphatic organic groups;

$R_2$ is selected from the group consisting of tetravalent aromatic, cycloaliphatic and aliphatic organic groups;

$R_3$ is selected from the group consisting of divalent or higher valent organic groups, which are derived from aromatic, cycloaliphatic or aliphatic groups optionally having a hydroxyl group; and n and m are each independently an integer of 1 or more.

Substituent $R_1$ $R_1$ is a divalent aromatic, cycloaliphatic or aliphatic organic group derived from a diamine-based compound, and specifically, it may be selected from the group consisting of divalent aromatic organic groups of Chemical Formulas 2a to 2d; divalent cycloaliphatic organic groups comprising a functional group of Chemical Formula 2e and a cycloalkandiyl group with carbon number 4 to 18; and divalent aliphatic organic groups comprising an alkandiyl group with carbon number 1 to 8. At this time, the cycloalkandiyl group and the alkandiyl group may be substituted with a substituent selected from the group consisting of an alkyl group with carbon number 1 to 10, a fluoroalkyl group with carbon number 1 to 10, an aryl group with carbon number 6 to 12 and a sulfonyl group:

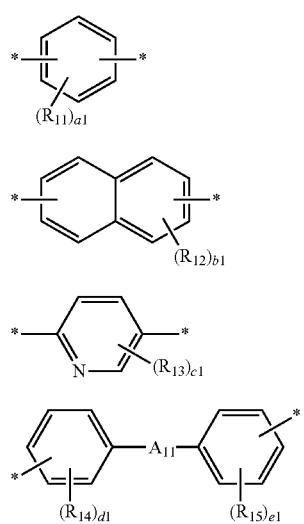

[Chemical Formula 2a]

[Chemical Formula 2b]

[Chemical Formula 2c]

[Chemical Formula 2d]

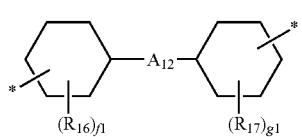

[Chemical Formula 2e]

$R_{11}$ to $R_{17}$ are each independently selected from the group consisting of an alkyl group with carbon number 1 to 10, a fluoroalkyl group with carbon number 1 to 10, an aryl group with carbon number 6 to 12, a sulfonyl group and a carboxyl group;

a1, d1 and e1 are each independently an integer of 0 to 4;

b1 is an integer of 0 to 6;

c1 is an integer of 0 to 3;

f1 and g1 are each independently an integer of 0 to 10; and $A_{11}$ and $A_{12}$ are each independently selected from a single bond, —O—, —$CR_{18}R_{19}$—, —C(=O)—, —C(=O)NH—, —S—, —$SO_2$—, phenylene group and a combination thereof, wherein $R_{18}$ and $R_{19}$ are each independently selected from the group consisting of hydrogen atom, alkyl group with carbon number 1 to 10 and fluoroalkyl group with carbon number 1 to 10.

Preferably, $R_1$ of Chemical Formula 1 may be a divalent organic group selected from the group consisting of divalent organic groups of Chemical Formulas 3a to 3u:

(3a)

(3b)

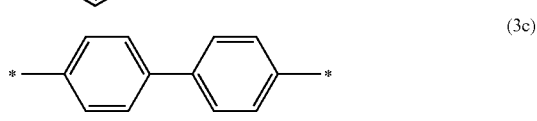

(3c)

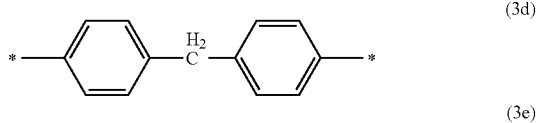

(3d)

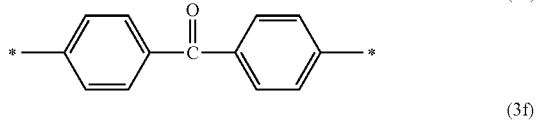

(3e)

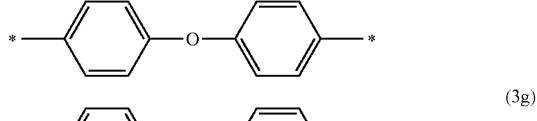

(3f)

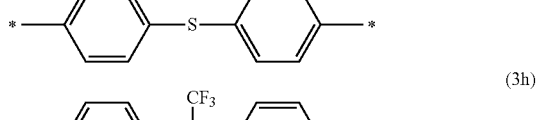

(3g)

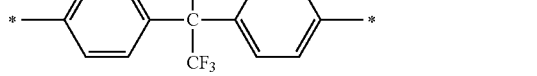

(3h)

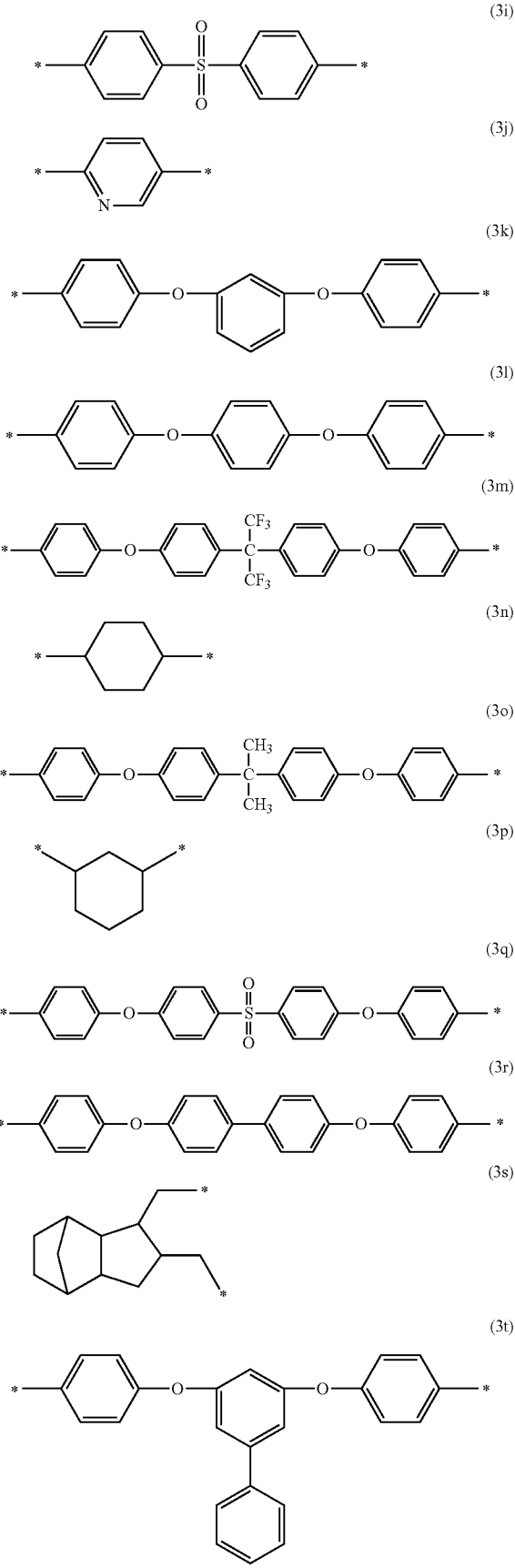
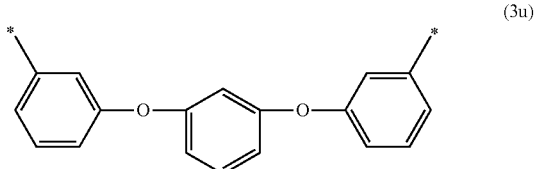

At least one hydrogen atom in the divalent functional groups of Chemical Formulas 3a to 3u may be substituted with a substituent selected from the group consisting of an alkyl group with carbon number 1 to 10, a fluoroalkyl group with carbon number 1 to 10, an aryl group with carbon number 6 to 12, a sulfonyl group and a carboxyl group.

More preferably, $R_1$ of Chemical Formula 1 may be selected from the divalent organic groups of Chemical Formulas 3c to 3e.

According to a preferred embodiment of the present invention, $R_1$ may be a divalent organic group derived from any one compound selected from the group consisting of diphenylether, biphenyl, methylenedianiline and 2,2'-bis(trifluoromethyl) biphenyl.

According to another preferred embodiment of the present invention, at least one hydrogen atom in the divalent organic group of $R_1$ may be substituted with a fluoroalkyl group with carbon number 1 to 10.

Substituent $R_2$ $R_2$ of Chemical Formula 1 is a tetravalent aromatic, cycloaliphatic, or aliphatic organic group derived from dianhydride, and specifically, it may be selected from the group consisting of tetravalent aromatic organic groups of Chemical Formulas 4a to 4d; tetravalent cycloaliphatic organic groups comprising a cycloalkane structure with carbon number 3 to 12; tetravalent cycloaliphatic organic groups of Chemical Formula 4e; and tetravalent aliphatic organic groups comprising a branched alkane structure with carbon number 1 to 10:

[Chemical Formula 4a]

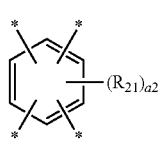

[Chemical Formula 4b]

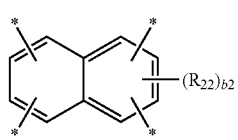

[Chemical Formula 4c]

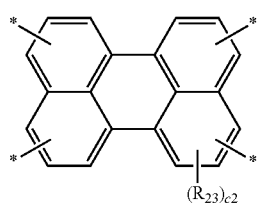

-continued

[Chemical Formula 4d]

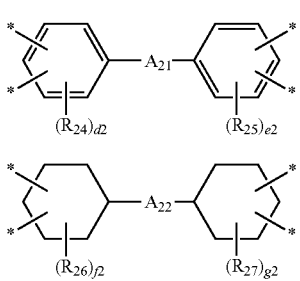

[Chemical Formula 4e]

wherein, $R_{21}$ to $R_{27}$ are each independently an alkyl group with carbon number 1 to 10 or a fluoroalkyl group with carbon number 1 to 10;

a2 is an integer of 0 or 2;

b2 is an integer of 0 to 4;

c2 is an integer of 0 to 8;

d2 and e2 are each independently an integer of 0 to 3;

f2 and g2 are each independently an integer of 0 to 9; and $A_{21}$ and $A_{22}$ are each independently selected from the group consisting of a single bond, —O—, —$CR_{28}R_{29}$—, —C(=O)—, —C(=O)NH—, —S—, —$SO_2$—, phenylene group and a combination thereof, wherein $R_{28}$ and $R_{29}$ are each independently selected from the group consisting of a hydrogen atom, an alkyl group with carbon number 1 to 10 and a fluoroalkyl group with carbon number 1 to 10.

Preferably, $R_2$ of Chemical Formula 1 may be selected from tetravalent organic groups of Chemical Formulas 5a to 5t:

(5a)

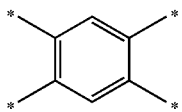

(5b)

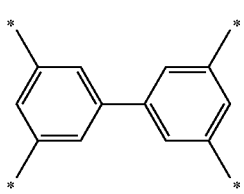

(5c)

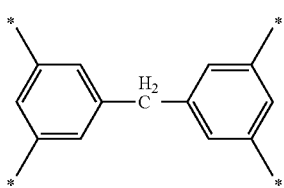

(5d)

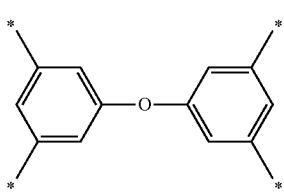

(5e)

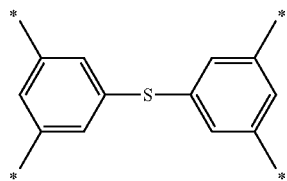

(5f)

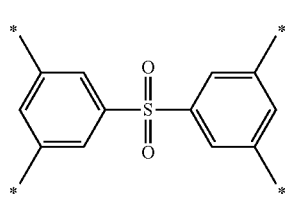

(5g)

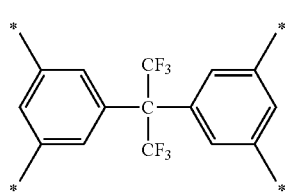

(5h)

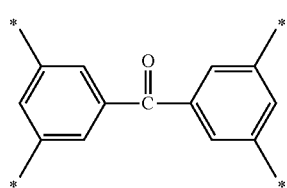

(5i)

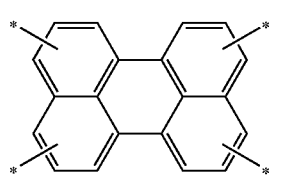

(5j)

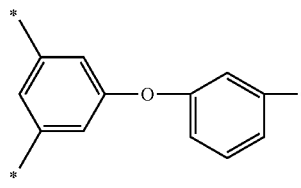

(5k)

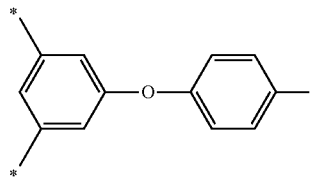

(5l)

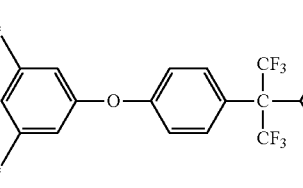

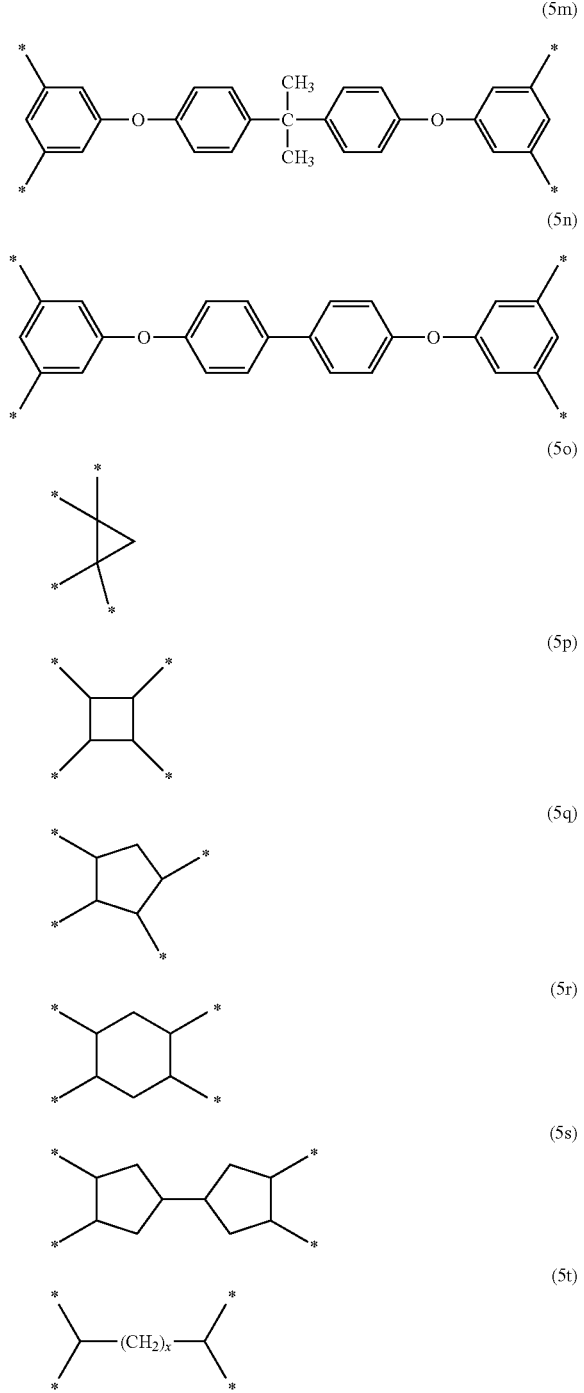

wherein, x is an integer of 1 to 3.

Further, at least one hydrogen atom in the tetravalent organic group of Chemical Formulas 5a to 5t may be substituted with an alkyl group with carbon number 1 to 10 or a fluoroalkyl group with carbon number 1 to 10.

Substituent $R_3$ $R_3$ of Chemical Formula 1 may comprise a divalent or higher valent aromatic, cycloaliphatic or aliphatic organic group, and the divalent or higher valent organic group may be a divalent or higher valent aromatic, cycloaliphatic or aliphatic, preferably, from divalent to decavalent organic group, which is derived from a diamine-based compound, wherein at least one hydrogen atom contained in the organic group is substituted with a hydroxyl group. It may be selected from the divalent organic group described for the substituent $R_1$ except that any one of the substituted hydroxyl group may be a reactive group participating in a bond with silica particles.

Particularly, it is preferable that at least one hydrogen atom in the organic group of $R_3$ is substituted with a fluoroalkyl group with carbon number 1 to 10, in terms of further enhanced transparency of a film produced therefrom.

Further, in Chemical Formula 1, m and n represents a number of repeating unit of the polymer, which are each independently an integer of 1 or more. The upper limit may be controlled as needed without having special limit The polyamic acid polymer composite according to the present invention may have a structure, wherein the silica-based particle is physically or chemically bonded into the polyamic acid comprising the repeating structure of Chemical Formula 1.

Specifically, when $R_3$ in the repeating unit of Chemical Formula 1 contains a hydroxyl group, an oxygen atom in the hydroxyl group acts as a nucleophile, and thereby the nucleophile reacts with an electrophile in the silane compound. As a result, the silica-based particle may be bonded to $R_3$ of the polyamic acid polymer via an ether bond, an amide bond, or an ester bond, which is formed from said reaction.

Further, the silica-based particle may be physically bonded by affinity with the fluoroalkyl group substituted to $R_1$ or $R_3$ of Chemical Formula 1.

Further, the silica-based particle may comprise —Si—O— bonds forming a network structure, and silicon on the surface of the silica-based particle and $R_3$ may form chemical bonds with each other.

The silica-based particle may be contained in an amount of 1 to 50 wt %, preferably 3 to 40 wt %, more preferably 5 to 30 wt %, based on the total solid weight of the polyamic acid polymer composite. When the amount of the silica-based particle contained in the polyamic acid polymer composite is too small, the effects according to the present invention may be meager, but when the amount of the silica-based particle is too large, physical properties of the polyimide film produced by using the polyamic acid polymer composite, for example, transparency may be deteriorated.

As the result of the introduction of the inorganic silica-based particle into the polyamic acid polymer, a polyimide film obtained by imdization of the polyamic acid polymer composite shows high transparency and low thermal expansion as low as glass level, and thereby it may be used as a substrate for a flexible display.

According to another embodiment of the present invention, a method for producing the polyamic acid polymer composite of Chemical Formula 1 comprises the steps of:

reacting diamine, tetracarboxylic acid dianhydride, and, optionally, diamine having a hydroxyl group to produce a polyamic acid having a repeating unit of Chemical Formula 7; and mixing and reacting the produced polyamic acid with a silica-based particle to produce a composite comprising a polyamic acid polymer having a repeating unit of Chemical Formula 1 and the silica-based particle, by; or reacting the produced polyamic acid and a silane compound of Chemical Formula 8 to produce a polyamic acid polymer and then reacting with alkoxysilane to produce a polyamic acid polymer composite, which comprises the repeating unit of Chemical Formula 1 and a silica-based particle which forms chemical bonds with $R_3$ of the repeating unit via a bond selected from the group consisting of an ether bond, an amide bond and an ester bond:

[Chemical Formula 7]

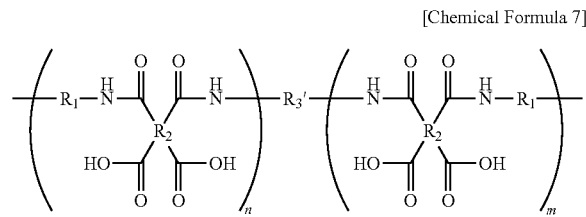

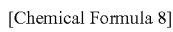 [Chemical Formula 8]

wherein, $R_1$, $R_2$, m and n have the same meanings as defined previously;

$R_3'$ is selected from the group consisting of divalent aromatic, cycloaliphatic and aliphatic organic groups selectively having a hydroxyl group, and the divalent aromatic, cycloaliphatic and aliphatic organic groups have the same meanings as defined previously;

R is an alkyl group with carbon number 1 to 5; and

X is a monovalent aliphatic or aromatic organic group comprising an electrophile.

Hereinafter, each step will be described in detail.

The step 1 is a step of producing a polyamic acid having a repeating unit of Chemical Formula 7 by reacting diamine, tetracarboxylic acid dianhydride, and, optionally, diamine having a hydroxyl group.

The diamine, which can be used for producing the polyamic acid, may be a compound comprising a divalent aromatic, cycloaliphatic or aliphatic organic group together with two amino groups, and the divalent aromatic, cycloaliphatic or aliphatic organic group is the same as described previously.

Specifically, it may be at least one selected from the group consisting of 2,2'-bis(trifluoromethyl)-4,4'-diaminobiphenyl, m-phenylenediamine, p-phenylenediamine, m-xylenediamine, p-xylenediamine, 1,5-diaminonaphthalene, 3,3'-dimethylbenzidine, 4,4'-(or 3,4'-, 3,3'-, 2,4'- or 2,2'-)diaminodiphenylmethane, 4,4'-(or 3,4'-, 3,3'-, 2,4'- or 2,2'-)diaminodiphenylether, 4,4'-(or 3,4'-, 3,3'-, 2,4'- or 2,2'-)diaminodiphenylsulfide, 4,4'-(or 3,4'-, 3,3'-, 2,4'- or 2,2'-)diaminodiphenylsulfone, 1,1,1,3,3,3-hexafluoro-2,2-bis(4-aminophenyl)propane, 2,2-bis(4-(4-aminophenoxy)phenyl)propane, 4,4'-benzophenonediamine, 4,4'-di-(4-aminophenoxy)phenylsulfone, 3,3'-dimethyl-4,4'-diaminodiphenylmethane, 4,4'-di-(3-aminophenoxy)phenylsulfone, 2,4-diaminotoluene, 2,5-diaminotoluene, 2,6-diaminotoluene, benzidine, 4,4'-diaminoterphenyl, 2,5-diaminopyridine, 4,4'-bis(p-aminophenoxy)biphenyl and hexahydro-4,7-methanoindanylene dimethylene diamine.

In particular, the tetracarboxylic acid dianhydride may be a tetracarboxylic acid dianhydride containing a tetravalent aromatic, cycloaliphatic or aliphatic organic group. The tetravalent aromatic, cycloaliphatic or aliphatic organic group is the same as described previously.

Preferably, the dianhydride may be at least one selected from the group consisting of butanetetracarboxylic dianhydride, pentanetetracarboxylic dianhydride, hexanetetracarboxylic dianhydride, cyclopentanetetracarboxylic dianhydride, bicyclopentanetetracarboxylic dianhydride, cyclopropanetetracarboxylic dianhydride, methylcyclohexanetetracarboxylic dianhydride, 3,3',4,4'-benzophenonetetracarboxylic dianhydride, 3,4,9,10-perylenetetracarboxylic dianhydride, 4,4'-sulfonyldiphthalic dianhydride, 3,3',4,4'-biphenyltetracarboxylic dianhydride, 1,2,5,6-naphthalenetetracarboxylic dianhydride, 2,3,6,7-naphthalenetetracarboxylic dianhydride, 1,4,5,8-naphthalenetetracarboxylic dianhydride, 2,3,5,6,-pyridinetetracarboxylic dianhydride, m-terphenyl-3,3',4,4'-tetracarboxylic dianhydride, p-terphenyl-3,3',4,4'-tetracarboxylic dianhydride, 4,4'-oxydiphthalicdianhydride, 1,1,1,3,3,3-hexafluoro-2,2-bis[(2,3 or 3,4-dicarboxyphenoxy)phenylpropane dianhydride, 2,2-bis[4-(2,3- or 3,4-dicarboxyphenoxy)phenyl]propane dianhydride and 1,1,1,3,3,3-hexafluoro-2,2-bis[4-(2,3- or 4-dicarboxyphenoxy)phenyl]propane dianhydride.

Further, the diamine having a hydroxyl group may be a compound having at least one hydroxyl group together with two or more amino groups in the molecule, and specifically, it may be a diamine containing a divalent aromatic, cycloaliphatic or aliphatic organic group, wherein at least one hydrogen atom in the divalent aromatic, cycloaliphatic or aliphatic organic group is substituted with a hydroxyl group. The divalent aromatic, cycloaliphatic or aliphatic organic group is the same as described previously.

Specifically, the diamine having a hydroxyl group may be at least one selected from the group consisting of 2,2-bis(3-amino-4-hydroxyphenyl)-hexafluoropropane, 3,3'-dihydroxy-4,4'-diaminobiphenyl and 2,2-bis(3-amino-4-hydroxyphenyl) sulfone.

Further, the diamine or the diamine having a hydroxyl group, wherein at least one hydrogen atom in the molecule is substituted with a fluoroalkyl group with carbon number 1 to 10 such as a trifluoromethyl group, is preferred because it may exert further enhanced transparency of a film produced therefrom.

The previously described method for producing a polyamic acid through the reaction of the diamine, dianhydride and diamine having a hydroxyl group may be conducted according to general methods for polyamic acid polymerization such as solution polymerization. Specifically, it may be produced by dissolving the diamine and the diamine having a hydroxyl group in an organic solvent such as N,N-dimethylacetamide (DMAc) and N-methylpyrrolidone (NMP), and then adding dianhydride in the resulting mixed solution followed by polymerization. At this time, the reaction may be conducted under an anhydrous condition, and then the polymerization may be conducted at a temperature of 25 to 50° C., preferably 40 to 45° C.

Further, the molar ratio between the diamine and the diamine having a hydroxyl group used for the polyamic acid polymerization reaction may be in the range of 99:1 to 60:40. If the amount of the diamine having a hydroxyl group is too small, it may be difficult to obtain the effect according to the present invention due to smaller amount of the binding site to the silane-based compound, but if the amount of the diamine having a hydroxyl group is too large, the heat resistance effect may be deteriorated. Within said molar ratio, the polyamic acid comprising the repeating unit of Chemical Formula 7 can be produced without said problem.

In step 2, a polyamic acid polymer is produced by mixing and reacting the produced polyamic acid comprising the repeating unit of Chemical Formula 7 with a silica-based particle, or by reacting the produced polyamic acid with a silane compound of Chemical Formula 8.

The silane compound of Chemical Formula 8 is a silane-based compound comprising a monovalent aliphatic organic group having an alkoxy group and an electrophile. Preferably, X in Chemical Formula 5 may be a chain-type alkyl group with carbon number 1 to 20, which comprises an electrophile selected from the group consisting of an isocyanate group, an ester group, an epoxy group and a combination thereof, and R may be an alkyl group with carbon number 1 to 5.

Specifically, the silane compound of Chemical Formula 8 may be isocyanato propyltriethoxysilane or 3-glycidyloxypropyl triethoxysilane.

When the polyamic acid comprising the repeating unit of Chemical Formula 7 is reacted with the silane compound of Chemical Formula 8 compound, the silane compound of Chemical Formula 8 may be used in an equivalent amount of the hydroxyl group in the diamine having a hydroxyl group in step 1.

Further, the reaction may be conducted at a temperature of 30 to 60° C., preferably.

Under the above reaction condition, an oxygen atom in the hydroxyl group contained in the functional group $R_3$ in the polyamic acid having the repeating unit of Chemical Formula 7 acts as a nucleophile, and thereby a reaction attacking an aliphatic chain comprising an electrophile in the silane compound of Chemical Formula 8 occurs. As the result of the reaction, an ether bond, an amide bond or an ester bond may be formed, and then a polyamic acid polymer, which comprises an alkoxysilane chemically bonded to $R_3$ of the repeating unit of Chemical Formula 7 via said bond, may be produced.

In step 3, a polyamic acid polymer composite is produced by the reaction between the polyamic acid polymer and an alkoxysilane.

The alkoxysilane is not particularly limited, but it may be selected from the group consisting of monoalkoxysilane, dialkoxysilane, trialkoxysilane and tetraalkoxysilane. Preferably, tetraalkoxysilane is used alone or together with mono-, di- or trialkoxysilane.

The amount of alkoxysilane may be selected so that the total amount of the $SiO_2$ produced from the silane compound of Chemical Formula 5 in step 2 and the alkoxysilane compound is 1 to 50 wt %, preferably 3 to 40 wt %, more preferably 5 to 30 wt %, based on the total solid.

Further, the reaction of the polyamic acid polymer and the alkoxysilane may be conducted under acidic conditions, in the presence of an acidic catalyst such as hydrochloric acid (HCl) and the like.

According to the method previously described, the polyamic acid polymer produced in step 2 and the alkoxysilane are reacted to form a silica-based particle containing —Si—O— bonds forming a network structure. Namely, the polyamic acid polymer composite comprising a silica-based particle chemically bonded to $R_3$ of the repeating unit of Chemical Formula 1 through this step is finally produced.

The Reaction Scheme 1 represents an exemplary reaction for producing the polyamic acid polymer composite according to the present invention. The Reaction Scheme 1 is intended to further illustrate the present invention, and the scope of the present invention cannot be limited thereby in any way.

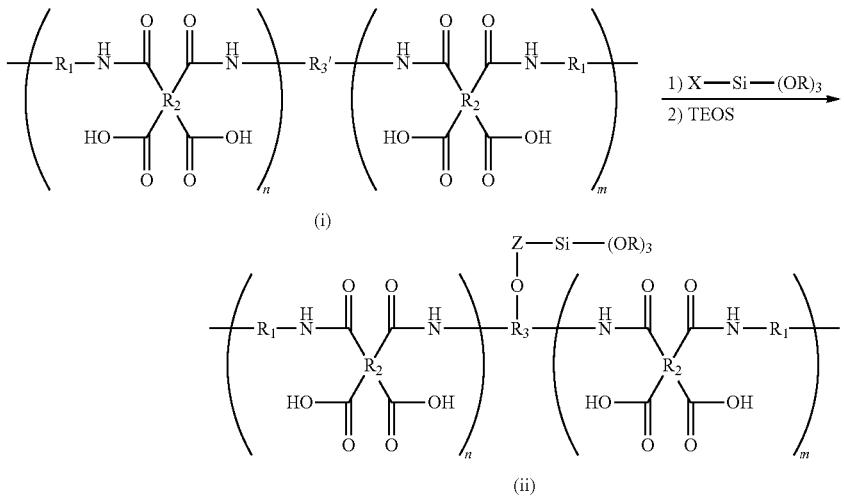

Wherein, $R_1$ to $R_3$, $R_3'$, X, m and n have the same meanings as defined previously, and Z is a linker such as an ether bond, an amide bond or an ester bond.

As shown in Reaction Scheme 1, when the polyamic acid (i) and the silane compound as an electrophile are reacted, Si in the silane compound is bonded to the polyamic acid via the Z linker as the result of the reaction between the hydroxyl group contained in $R_3$ of the polyamic acid is reacted with the electrophile, and then tetraethylorthosilicate (TEOS) may be treated thereto so as to form a silica particle.

On the other hand, the present invention provides a method for producing a display substrate by curing the polyamic acid polymer composite having the repeating unit of Chemical Formula 1.

Specifically, the present invention provides a method for producing a display substrate comprising the steps of:

forming a polyimide film by coating a composition comprising the polyamic acid polymer composite having the repeating unit of Chemical Formula 1 on a support followed by curing thereof; and separating the polyimide film from the support.

The composition comprising the polyamic acid polymer composite comprises the polyamic acid polymer composite together with an organic solvent, and the organic solvent may be the same as described previously.

The amount of the polyamic acid polymer composite contained in the composition is not particularly limited, but it may be selected so that the viscosity of the composition is in the range of 5,000 to 50,000 cP in consideration of a coating process.

The support may be glass, metal substrate, plastic substrate and the like, but not limited thereto. Among them, a glass substrate may be preferred because it has excellent thermal and chemical stability, and it can be easily separated from the cured polyimide film without any damage, without treatment of a releasing agent, during the curing process to the polyamic acid polymer composite.

The coating process may be conducted according to general coating methods, and specifically, the methods may be spin coating method, bar coating method, roll coating method, air-knife method, graveur method, reverse roll method, kiss roll method, doctor blade method, spray method, dip coating method or brushing method.

Further, during the coating process, the composition comprising the polyamic acid polymer composite may be coated on the support in an amount that the film finally produced has proper thickness for a display substrate, specifically, 10 to 30 μm.

Further, the curing process may be conducted by heat treatment at a temperature of 80 to 400° C., and it may be conducted by multi-step heating at various temperatures in said temperature range.

Through said curing process, the polyamic acid polymer composite may be imidized so as to produce a polyimide polymer composite.

The polyimide polymer composite may have a structure comprising a silica-based particle, which is physically or chemically bonded to $R_3$ of the repeating unit of Chemical Formula 6 via a bond selected from the group consisting of an ether bond, an amide bond and an ester bond.

[Chemical Formula 6]

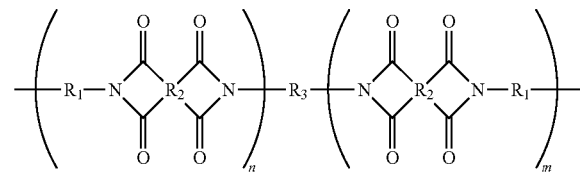

wherein, $R_1$ to $R_3$, m and n have the same meanings as defined previously.

In the present invention, a display substrate produced by said method may be provided.

Specifically, the display substrate comprises the polyimide polymer composite comprising a silica-based particle, which is physically or chemically bonded to $R_3$ of the repeating unit of Chemical Formula 6 via a bond selected from the group consisting of an ether bond, an amide bond and an ester bond.

The display substrate comprising the polyimide polymer composite, wherein the silica-based particle is physically or chemically bonded to the polyimide polymer, may be applied to a flexible display due to its high transparency and low thermal expansion as low as glass-level. Specifically, the display substrate may have light transmittance of 80% or more at a wavelength of 550 nm without haze, in a film thickness range of 10 to 30 μm; coefficient of thermal expansion (CTE) of 20 ppm/K or less in a temperature range of 100 to 300° C.; and glass transition temperature (Tg) of 350° C. or more.

Hereinafter, the present invention is explained by the following Examples and Test Examples in more detail. The following Examples and Test Examples are intended to further illustrate the present invention, and the scope of the present invention cannot be limited thereby in any way.

Example 1

2,2'-Bis(trifluoromethyl)-4,4'-diaminobiphenyl (TFMB, 0.128 mol) and 2,2'-bis(3-amino-4-hydroxyphenyl)hexafluoropropane (BisApAf, 0.007 mol) were dissolved in anhydrous DMAc 334 g, and then 3,3',4,4'-biphenyltetracarboxylic dianhydride (BPDA, 0.136 mol) was added thereto followed by stirring at 45° C. for 2 hours and then at 40° C. for 24 hours. The molar ratio of diamines was adjusted to TFMB:BisApAf=95:5, and the reaction was conducted under anhydrous condition.

The resulting BPDA-TFMB-BisApAf solution was heated to 50° C., and isocyanatopropyltriethoxysilane (ICTEOS) 1.683 g was added thereto followed by stirring for 2 hours. ICTEOS was dropped in an equivalent amount of the hydroxyl group of the BisApAf.

The resulting polyamic acid polymer-containing solution was heated to 60° C., and then tetraethylorthosilicate (TEOS) 13.045 g and 0.1 N HCl 8.342 g were added thereto followed by stirring for 4 hours to obtain a solution containing a polyamic acid polymer composite. The total amount of $SiO_2$ produced from ICTEOS and TEOS was adjusted to 5 wt % based on the total solid.

Example 2

2,2'-Bis(trifluoromethyl)-4,4'-diaminobiphenyl (TFMB, 0.048 mol) and 2,2'-bis(3-amino-4-hydroxyphenyl)hexafluoropropane (BisApAf, 0.003 mol) were dissolved in anhydrous DMAc 97 g, and then 4,4'-oxydiphthalic anhydride (ODPA, 0.051 mol) was added thereto followed by stirring at 45° C. for 2 hours and then at 40° C. for 24 hours. Molar ratio of diamine was adjusted to TFMB:BisApAf=95:5, and the above reaction was conducted under anhydrous condition.

All procedures thereafter were identically conducted as described in Example 1.

Example 3

2,2'-Bis(trifluoromethyl)-4,4'-diaminobiphenyl (TFMB, 0.037 mol) and 2,2'-bis(3-amino-4-hydroxyphenyl)hexafluoropropane (BisApAf, 0.002 mol) were dissolved in anhydrous DMAc 102 g, and then 3,3',4,4'-biphenyltetracarboxylic dianhydride (BPDA, 0.027 mol) and 4,4'-(hexafluoroisopropylidene)diphthalic anhydride (6FDA, 0.012 mol) were added thereto followed by stirring at 45° C. for 2 hours and then at 40° C. for 24 hours. The molar ratio of diamines was adjusted to TFMB:BisApAf=95:5, and the above reaction was conducted under anhydrous condition.

All procedures thereafter were identically conducted as described in Example 1.

Example 4

2,2'-Bis(trifluoromethyl)-4,4'-diaminobiphenyl (TFMB, 0.064 mol) was dissolved in DMAc 100 g, 4,4-oxydiphthalic anhydride (ODPA, 0.064 mol) was added thereto, and then the resulting solution was added to DMAc 73 g followed by stirring at 50° C. for 3 hours and then at room temperature for 24 hours.

Silica nanoparticle ($SiO_2$, 20 nm), dispersed in DMAc in an amount of 20 wt %, was added to the polyamic acid solution thus obtained in an amount of 20 wt % based on the polyamic acid solid followed by stirring for 4 hours to obtain a solution containing a polyamic acid polymer composite.

Example 5

2,2'-Bis(trifluoromethyl)-4,4'-diaminobiphenyl (TFMB, 0.064 mol) was dissolved in DMAc 100 g, 4,4-oxydiphthalic anhydride (ODPA, 0.064 mol) was added thereto, and then the resulting solution was added to DMAc 73 g followed by stirring at 50° C. for 3 hours and then at room temperature for 24 hours.

Silica nanoparticle ($SiO_2$, 20 nm), dispersed in DMAc in an amount of 20 wt %, was added to the polyamic acid solution thus obtained in an amount of 30 wt % based on the polyamic acid solid followed by stirring for 4 hours to obtain a solution containing a polyamic acid polymer composite.

Comparative Example 1

2,2'-Bis(trifluoromethyl)-4,4'-diaminobiphenyl (TFMB, 0.286 mol) was dissolved in anhydrous DMAc 706 g, and then 3,3',4,4'-biphenyltetracarboxylic dianhydride (BPDA) 0.289 mol was added thereto followed by stirring at 45° C. for 2 hours and then at 40° C. for 24 hours to obtain a solution containing a polyamic acid. The above reaction was conducted under anhydrous condition.

Comparative Example 2

2,2'-Bis(trifluoromethyl)-4,4'-diaminobiphenyl (TFMB, 0.128 mol) and 2,2'-bis(3-amino-4-hydroxyphenyl)hexafluoropropane (BisApAf, 0.007 mol) were dissolved in anhydrous DMAc 334 g, and then 3,3',4,4'-biphenyltetracarboxylic dianhydride (BPDA, 0.136 mol) was added thereto followed by stirring at 45° C. for 2 hours and then at 40° C. for 24 hours to obtain a solution containing a polyamic acid. The molar ratio of diamines was adjusted to TFMB:BisApAf=95:5, and the above reaction was conducted under anhydrous condition.

Comparative Example 3

2,2'-Bis(trifluoromethyl)-4,4'-diaminobiphenyl (TFMB, 0.035 mol) and 3,3-dihydroxybenzidine (DHB, 0.002 mol) were added to anhydrous DMAc 97 g, and then 3,3'-4,4'-biphenyltetracarboxylic dianhydride (BPDA, 0.037 mol) was added thereto followed by stirring at 45° C. for 2 hours and then at 40° C. for 24 hours to obtain a solution containing a polyamic acid. The molar ratio of diamine was adjusted to TFMB:DHB=95:5, and the above reaction was conducted under anhydrous condition.

Comparative Example 4

2,2'-Bis(trifluoromethyl)-4,4'-diaminobiphenyl (TFMB, 0.064 mol) was dissolved in DMAc 100 g, 4,4'-oxydiphthalic anhydride (ODPA, 0.064 mol) was added thereto, and then the resulting solution was added to DMAc 73 g followed by stirring at 50° C. for 3 hours and then at room temperature for 24 hours.

Comparative Example 5

4,4'-Methylenebis(2-methylcyclohexylamine) (MEMCHA, 0.092 mol) was dissolved in anhydrous DMAc 100 g, and then 4,4'-oxydiphthalic anhydride (ODPA, 0.092 mol) was added thereto followed by stirring at 50° C. for 2 hours and then at room temperature for 24 hours to obtain a solution containing a polyamic acid. The above reaction was conducted under anhydrous condition.

Comparative Example 6

4,4'-Methylenebis(2-methylcyclohexylamine) (MEMCHA, 0.092 mol) was dissolved in anhydrous DMAc 100 g, and then 4,4'-oxydiphthalic anhydride (ODPA, 0.092 mol) was added thereto followed by stirring at 50° C. for 2 hours and then at room temperature for 24 hours to obtain a solution containing a polyamic acid. The above reaction was conducted under anhydrous condition.

Silica nanoparticle ($SiO_2$, 20 nm), dispersed in DMAc in an amount of 20 wt %, was added to the polyamic acid solution thus obtained in an amount of 5 wt % based on the polyamic acid solid followed by stirring for 4 hours to obtain a solution containing a polyamic acid polymer composite.

Comparative Example 7

4,4'-Methylenebis(2-methylcyclohexylamine) (MEMCHA, 0.092 mol) was dissolved in anhydrous DMAc 100 g, and then 4,4'-oxydiphthalic anhydride (ODPA, 0.092 mol) was added thereto followed by stirring at 50° C. for 2 hours and then at room temperature for 24 hours to obtain a solution containing a polyamic acid. The above reaction was conducted under anhydrous condition.

Silica nanoparticle ($SiO_2$, 20 nm), dispersed in DMAc in an amount of 20 wt %, was added to the polyamic acid solution thus obtained in an amount of 15 wt % based on the polyamic acid solid followed by stirring for 4 hours to obtain a solution containing a polyamic acid polymer composite.

Ingredients used for producing the above polyamic acid solutions produced in Examples 1 to 5 and Comparative Examples 1 to 7 are as follows.

TABLE 1

| | diamine | Anhydride | Silica Addition |
|---|---|---|---|
| Example 1 | TFMB/BisApAf | BPDA | 5 wt % |
| | | | By Sol-gel reaction |
| Example 2 | TFMB/BisApAf | ODPA | 5 wt % |
| | | | By Sol-gel reaction |
| Example 3 | TFMB/BisApAf | BPDA/ 6FDA | 5 wt % |
| | | | By Sol-gel reaction |
| Example 4 | TFMB | ODPA | 20 wt % |
| Example 5 | TFMB | ODPA | 30 wt % |
| Comparative Example 1 | TFMB | BPDA | No addition |
| Comparative Example 2 | TFMB/BisApAf | BPDA | No addition |
| Comparative Example 3 | TFMB/DHB | BPDA | No addition |
| Comparative Example 4 | TFMB | ODPA | No addition |
| Comparative Example 5 | MBMCHA | ODPA | No addition |
| Comparative Example 6 | MBMCHA | ODPA | 5 wt % |
| Comparative Example 7 | MBMCHA | ODPA | 15 wt % |

TFMB: 2,2'-bis(trifluoromethyl)-4,4'-diaminobiphenyl
BisApAf: 2,2'-bis(3-amino-4-hydroxyphenyl)hexafluoropropane
DHB: 3,3-dihydroxybenzidine
MBMCHA: 4,4'-methylenebis(2-methylcyclohexylamine)
BPDA: 3,3',4,4'-biphenyltetracarboxylic dianhydride
ODPA: 4,4'-oxydiphthalic anhydride
6FDA: 4,4'-9hexafluroisopropylidene)diphthalic anhydride

Preparation Example 1

The solutions containing a polyamic acid polymer composite prepared in Examples 1 to 3 and the solutions containing a polyamic acid prepared in Comparative Examples 1 to 4 were adjusted to proper solid wt % to have viscosity of 10,000 cP, respectively, and then the prepared solutions were spin coated on a glass substrate to the thickness of 20 μm, respectively. The glass substrates coated with the solutions of Examples 1 to 3 and Comparative Examples 1 to 4 were put into an oven, heated at the rate of 2° C./min, and then cured by keeping at 80° C. for 15 min, at 150° C. for 30 min, at 220° C. for 30 min and at 350° C. for 1 hour. When the curing was completed, the glass substrates were put into water so as to peel off the film formed on the glass substrate, and then dried in an oven at 100° C.

Preparation Example 2

The solutions containing a polyamic acid polymer composite prepared in Examples 4 and 5 and the solutions containing a polyamic acid prepared in Comparative Examples 5 to 7 were adjusted to proper solid wt % to have viscosity of 10,000 cP, respectively, and then the prepared solutions were spin coated on a glass substrate to the thickness of 20 μm, respectively. The glass substrates coated with the solutions of Examples 4 and 5 and Comparative Examples 5 to 7 were put into an oven, heated at the rate of 2° C./min, and then cured by keeping at 80° C. for 15 min, at 150° C. for 30 min, at 220° C. for 30 min and at 300° C. for 1 hour. When the curing was completed, the glass substrates were put into water so as to peel off the film formed on the glass substrate, and then dried in an oven at 100° C.

Test Example 1

Transmittance of the polyimide films produced according to Preparation Examples was measured at 400, 450 and 550 nm. Transmittance was measured by using an UV spectrometer (G1103A, Agilent) at a wavelength in the range of 300 to 800 nm.

TABLE 2

| | | Thickness (μm) | Transmittance (%) | |
|---|---|---|---|---|
| | | | 450 nm | 550 nm |
| Preparation Example 1 | Example 1 | 20 | 76.8 | 88.2 |
| | Example 2 | 20 | 78 | 88 |
| | Example 3 | 19 | 79 | 88 |
| | Comparative Example 1 | 18 | 80.8 | 90.6 |
| | Comparative Example 2 | 20 | 76.6 | 87.3 |
| | Comparative Example 3 | 20 | 44.1 | 74.8 |
| | Comparative Example 4 | 20 | 84.9 | 87.9 |
| Preparation Example 2 | Example 4 | 20 | 82 | 88 |
| | Example 5 | 20 | 81 | 88.3 |
| | Comparative Example 5 | 20 | 85 | 89 |
| | Comparative Example 6 | — | Solution coagulation | Solution coagulation |
| | Comparative Example 7 | — | Solution coagulation | Solution coagulation |
| | Glass (0.7 T) | 700 | 90.0 | 90.0 |

According to the result in Table 1, it could be found that the films produced by using the composite solutions of Examples 1 to 5 were on par with the films of Comparative Examples in terms of transmittance, without reduction of transmittance. On the contrary, Comparative Example 3 showed reduced transmittance compared with Examples 1 to 3 produced by the same process because a $CF_3$ group did not exist on the diamine having a hydroxyl group, and the solutions of Comparative Examples 6 and 7 could not be coated due to silica coagulation.

Test Example 2

The polyimide films produced according to Preparation Examples were cut into the size of 15×5 mm, respectively, heated at 150° C. for 5 min, cooled to 30° C., heated at the rate of 10° C./min, and then the coefficient of thermal expansion (CTE) was measured by applying 0.05 N. The coefficient of thermal expansion was measured by using TMA (SDTA840, TA Instrument) in the range of 100 to 300° C. The measured results are shown in the following Table 3.

TABLE 3

| | | Thickness (μm) | CTE (ppm/K), 100~300° C. | Tg (° C.) |
|---|---|---|---|---|
| Preparation Example 1 | Example 1 | 20 | 5.79 | 450< |
| | Example 2 | 20 | 26.0 | 355 |
| | Example 3 | 19 | 14.5 | 450< |
| | Comparative Example 1 | 18 | 23.8 | 357 |
| | Comparative Example 2 | 20 | 19.4 | 388 |
| | Comparative Example 3 | 20 | 18 | 360 |
| | Comparative Example 4 | 20 | 51 | 293 |
| Preparation Example 2 | Example 4 | 20 | 20.0 | 350 |
| | Example 5 | 20 | 18.0 | 350 |
| | Comparative Example 5 | 20 | 41.6 | 305 |
| | Comparative Example 6 | — | Solution coagulation | Solution coagulation |
| | Comparative Example 7 | — | Solution coagulation | Solution coagulation |
| | Glass | 700 | 3.7 | — |

As described above, it could be found that the polyimide film, which is produced by using the polyamic acid polymer composite according to the present invention, has the coefficient of thermal expansion of 20 ppm or less as well as high transparency.

While the invention has been described with respect to the above specific embodiments, it should be recognized that various modifications and changes may be made and also fall within the scope of the invention as defined by the claims that follow.

What is claimed is:

1. A polyamic acid polymer composite comprising: 50 to 99 wt % of a polyamic acid polymer having a repeating unit of Chemical Formula 1; and 1 to 50 wt % of a silica-based particle, wherein a silicon atom on the surface of the silica-based particle is chemically bonded to $R_3$ of Chemical Formula 1:

[Chemical Formula 1]

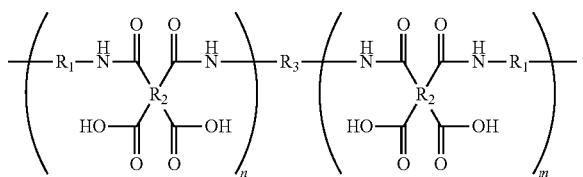

wherein, $R_1$ is selected from the group consisting of divalent aromatic and cycloaliphatic organic groups, wherein one or more hydrogen atoms in the aromatic or cycloaliphatic rings are substituted with a fluoroalkyl group with carbon number 1 to 10;

$R_2$ is selected from the group consisting of tetravalent aromatic, cycloaliphatic and aliphatic organic groups;

$R_3$ is selected from the group consisting of trivalent or higher valent organic groups, which are derived from aromatic, cycloaliphatic or aliphatic groups having a hydroxyl group, wherein one or more hydrogen atoms in the organic group of $R_3$ are substituted with a fluoroalkyl group with carbon number 1 to 10; and n and m are each independently an integer of 1 or more;

wherein $R_1$ of Chemical Formula 1 is a divalent organic group, which is selected from the group consisting of divalent aromatic organic groups of Chemical Formulas 2a to 2d; divalent organic groups of Chemical Formula 2e; and divalent cycloaliphatic organic groups comprising a cycloalkandiyl structure with carbon number 4 to 18:

[Chemical Formula 2a]

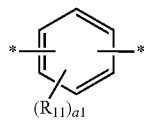

[Chemical Formula 2b]

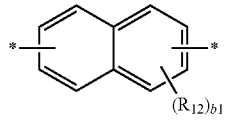

[Chemical Formula 2c]

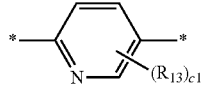

[Chemical Formula 2d]

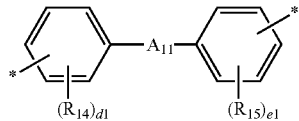

[Chemical Formula 2e]

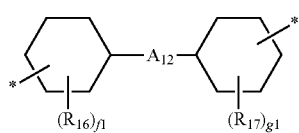

wherein, $R_{11}$ to $R_{17}$ are each independently a fluoroalkyl group with carbon number 1 to 10;

a1 is an integer of 1 to 4;

b1 is an integer of 1 to 6;

c1 is an integer of 1 to 3;

d1 and e1 are each independently an integer of 0 to 4, with the proviso that d1 and e1 cannot be 0 at the same time;

f1 and g1 are each independently an integer of 0 to 10, with the proviso that f1 and g1 are cannot be 0 at the same time; and $A_{11}$ and $A_{12}$ are a single bond.

2. The polyamic acid polymer composite according to claim 1, wherein the silica-based particle is chemically bonded to $R_3$ of the repeating unit via a bond selected from the group consisting of an ether bond, an amide bond and an ester bond.

3. The polyamic acid polymer composite according to claim 1, wherein the silica-based particle comprises —Si—O— bonds forming a network structure.

4. The polyamic acid polymer composite according to claim 1, wherein $R_2$ of Chemical Formula 1 is selected from the group consisting of tetravalent aromatic organic groups of Chemical Formulas 4a to 4d; tetravalent organic groups comprising a cycloalkane structure with carbon number 3 to 12; and tetravalent organic groups of Chemical Formula 4e:

[Chemical Formula 4a]

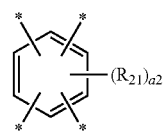

[Chemical Formula 4b]

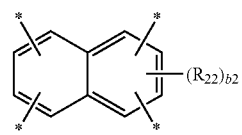

[Chemical Formula 4c]

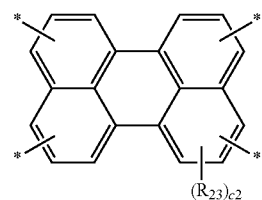

[Chemical Formula 4d]

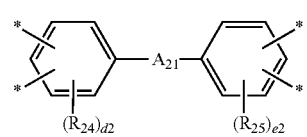

[Chemical Formula 4e]

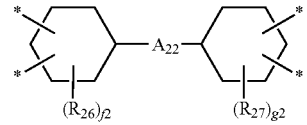

wherein, $R_{21}$ to $R_{27}$ are each independently fluoroalkyl group with carbon number 1 to 10;

a2 is an integer of 1 or 2;

b2 is an integer of 1 to 4;

c2 is an integer of 1 to 8;

d2 and e2 are each independently an integer of 0 to 3, with the proviso that d2 and e2 cannot be 0 at the same time;

f2 and g2 are each independently an integer of 0 to 9, with the proviso that f2 and g2 cannot be 0 at the same time; and $A_{21}$ and $A_{22}$ are a single bond.

5. The polyamic acid polymer composite according to claim 1, wherein $R_2$ of Chemical Formula 1 is a tetravalent organic group selected from the group consisting of tetravalent organic groups of Chemical Formula 5a to 5t:
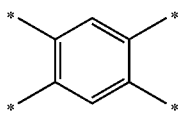
(5a)
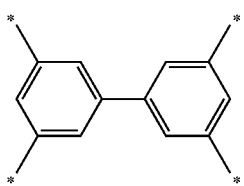
(5b)
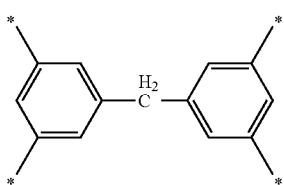
(5c)
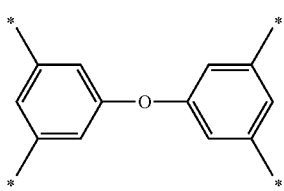
(5d)
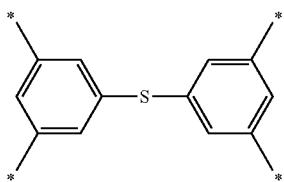
(5e)
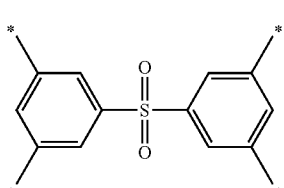
(5f)
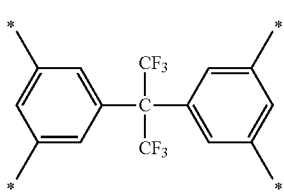
(5g)
-continued
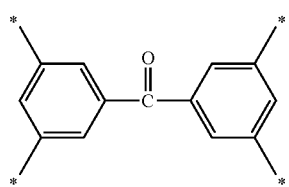
(5h)
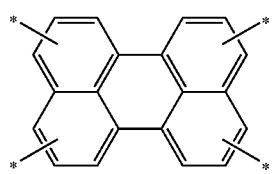
(5i)
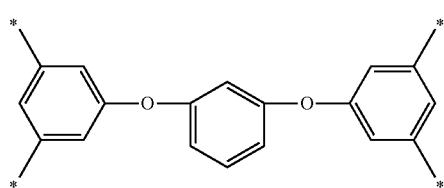
(5j)
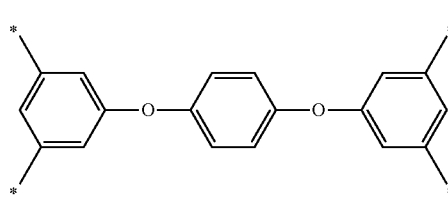
(5k)
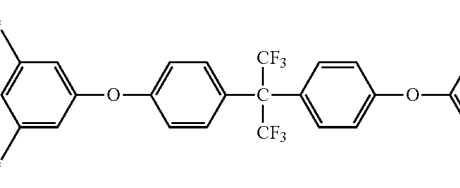
(5l)
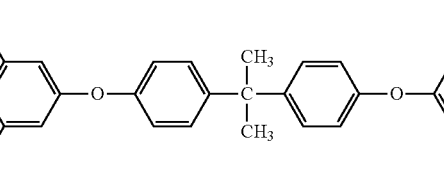
(5m)
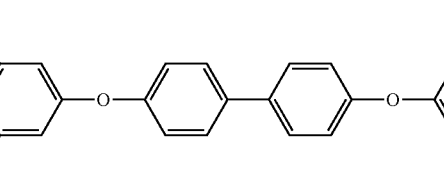
(5n)
(5o)

(5p)

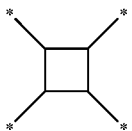

(5q)

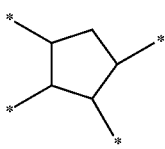

(5r)

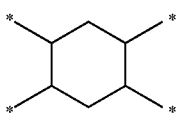

(5s)

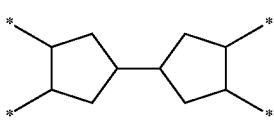

(5t)

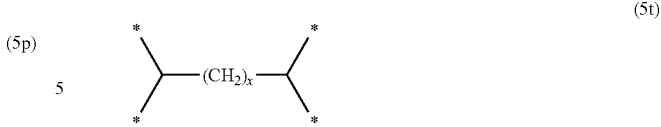

wherein, x is an integer of 1 to 3.

6. The polyamic acid polymer composite according to claim 1, wherein $R_3$ of Chemical Formula 1 is an organic group derived 2,2-bis(3-amino-4-hydroxyphenyl)-hexafluoropropane.

7. A polyimide polymer composite, which is obtained by curing the polyamic acid composite of claim 1, comprising a polyimide having a repeating unit of Chemical Formula 6, and a silica-based particle:

[Chemical Formula 6]

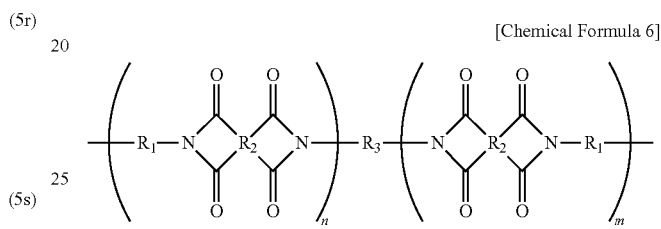

wherein, $R_1$, $R_2$ and $R_3$ have the same meanings as defined in Chemical Formula 1.

* * * * *